United States Patent
Grant

(10) Patent No.: US 10,387,152 B2
(45) Date of Patent: Aug. 20, 2019

(54) SELECTING BRANCH INSTRUCTION EXECUTION PATHS BASED ON PREVIOUS BRANCH PATH PERFORMANCE

(71) Applicant: ARM LIMITED, Cambridge (GB)

(72) Inventor: Alasdair Grant, Cambridge (GB)

(73) Assignee: ARM Limited, Cambridge (GB)

( * ) Notice: Subject to any disclaimer, the term of this patent is extended or adjusted under 35 U.S.C. 154(b) by 13 days.

(21) Appl. No.: 15/642,556

(22) Filed: Jul. 6, 2017

(65) Prior Publication Data

US 2019/0012174 A1    Jan. 10, 2019

(51) Int. Cl.
| | |
|---|---|
| *G06F 9/38* | (2018.01) |
| *G06F 9/30* | (2018.01) |
| *G06F 1/3287* | (2019.01) |
| *G06F 1/3296* | (2019.01) |

(52) U.S. Cl.
CPC ........ *G06F 9/30058* (2013.01); *G06F 1/3287* (2013.01); *G06F 1/3296* (2013.01); *G06F 9/30145* (2013.01); *G06F 9/3842* (2013.01)

(58) Field of Classification Search
CPC .................................................. G06F 9/3842
See application file for complete search history.

(56) References Cited

U.S. PATENT DOCUMENTS

| | | | | |
|---|---|---|---|---|
| 6,687,812 B1* | 2/2004 | Shimada | ............. | G06F 9/30072 712/230 |
| 2008/0155496 A1* | 6/2008 | Hatano | ................. | G06F 9/3842 717/106 |
| 2014/0189330 A1* | 7/2014 | Zaks | ..................... | G06F 8/4441 712/239 |
| 2014/0201508 A1* | 7/2014 | Busaba | ..................... | G06F 9/38 712/239 |
| 2016/0283245 A1* | 9/2016 | Ben-Kiki | ............. | G06F 9/3822 |

* cited by examiner

*Primary Examiner* — Jacob Petranek

(74) *Attorney, Agent, or Firm* — Nixon & Vanderhye P.C.

(57) ABSTRACT

A data processing system includes decoder circuitry responsive to a performance-steered branch instruction to select between multiple paths through the program in dependence upon performance signals indicative of performance characteristics associated with executing those paths. The performance characteristics may include an indication of whether the path concerned includes events such as a cache miss, a store exclusive failure, triggering of undefined instruction trap, an undesirable power management event, execution of a hint instruction, exceeding a predetermined number of processing cycles etc. The different paths between which a selection has been made can converge at a join instruction. Execution of a join instruction triggers evaluation circuitry to evaluate and store performance characteristics which may subsequently be used to steer the performance-steered branch instruction when it is encountered again.

19 Claims, 7 Drawing Sheets

| | |
|---|---|
| Source Code Compiled to PSB Instruction | if (_choose ( )) {<br>    ... first path ...<br>} else {<br>    ... second path ...<br>} |

FIG. 6

SELECTING BRANCH INSTRUCTION EXECUTION PATHS BASED ON PREVIOUS BRANCH PATH PERFORMANCE

BACKGROUND

Technical Field

This disclosure relates to the field of data processing systems. More particularly, this disclosure relates to branch instructions within data processing systems.

Technical Background

It is known to provide data processing systems which support branch instructions. Branch instructions serve to redirect the program flow when executing a sequence of program instructions. A conditional branch instruction will redirect program flow by following the branch in dependence upon an architectural variable, such as whether condition code flags depending upon preceding processing operations are set.

SUMMARY

At least some example embodiments of the present disclosure provide processing circuitry to perform processing operations specified by program instructions; and decoder circuitry to decode program instructions to generate control signals to control said processing circuitry to perform processing operations specified by said program instructions; wherein said decoder circuitry is responsive to a performance-steered branch instruction to generate control signals to control said processing circuitry to selectively perform a branch operation such that program flow follows one of a plurality of paths in dependence upon one or more performance signals indicative of one or more performance characteristics associated with execution of program instructions within at least one of said plurality of paths.

At least some example embodiments of the present disclosure provide processing means for performing processing operations specified by program instructions; and decoder means for decoding program instructions to generate control signals to control said processing circuitry to perform processing operations specified by said program instructions; wherein said decoder means is responsive to a performance-steered branch instruction to generate control signals to control said processing circuitry to selectively perform a branch operation such that program flow follows one of a plurality of paths in dependence upon one or more performance signals indicative of one or more performance characteristics associated with execution of program instructions within at least one of said plurality of paths.

At least some example embodiments of the present disclosure provide performing using processing circuitry processing operations specified by program instructions; and decoding program instructions to generate control signals to control said processing circuitry to perform processing operations specified by said program instructions; wherein in response to a performance-steered branch instruction, generating control signals to control said processing circuitry to selectively perform a branch operation such that program flow follows one of a plurality of paths in dependence upon one or more performance signals indicative of one or more performance characteristics associated with execution of program instructions within at least one of said first plurality of paths.

At least some further example embodiments of the present disclosure may have the form of a virtual machine providing an execution environment to execute program instructions in accordance with the above described method.

BRIEF DESCRIPTION OF THE DRAWINGS

Example embodiments will be described, by way of example only, with reference to the accompanying drawings in which:

FIG. 6 schematically illustrates source code which may be compiled to a form including a performance-steered branch instructions.

DESCRIPTION OF EXAMPLES

Figure 1:
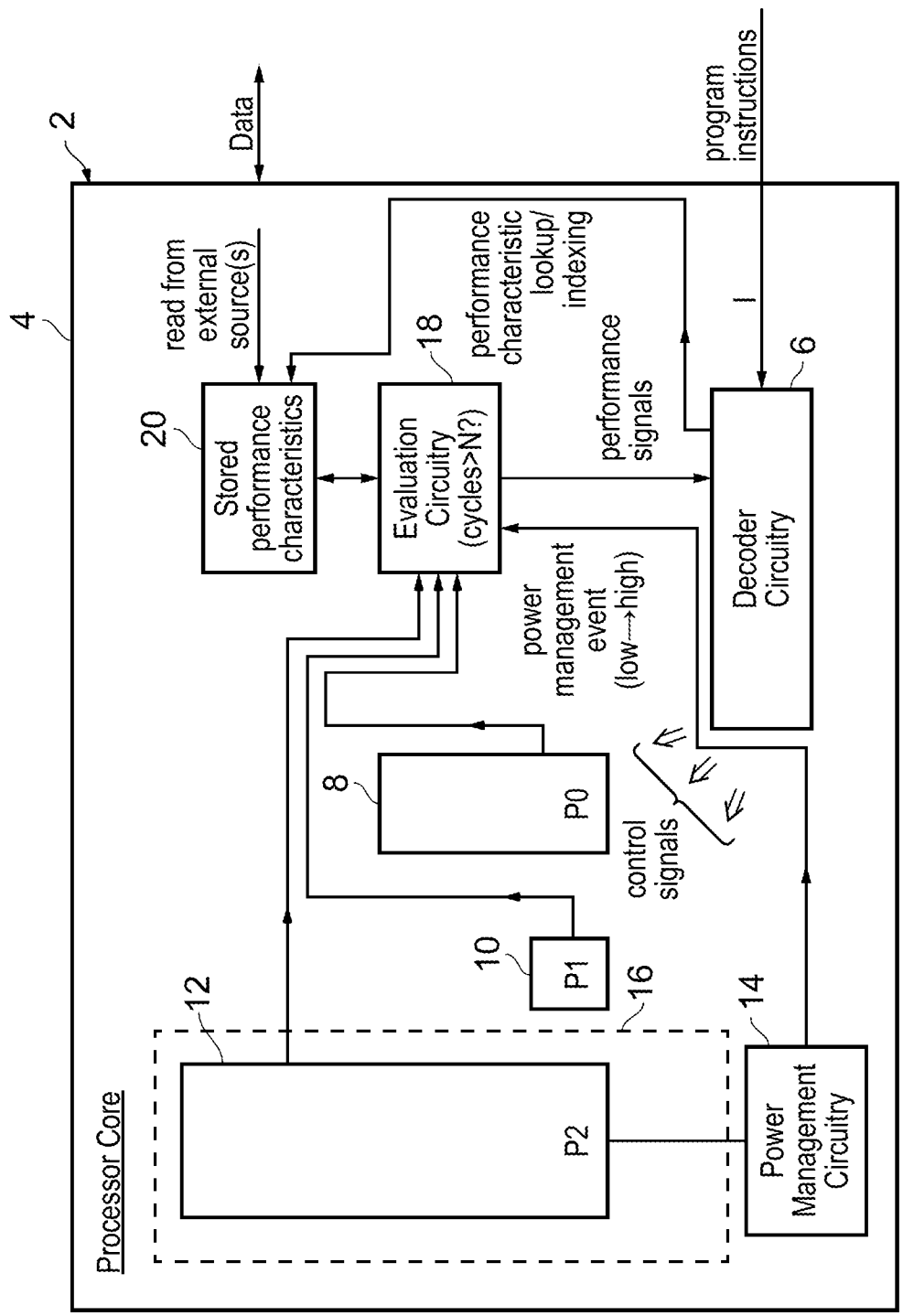
FIG. 1 schematically illustrates a data processing system supporting performance-steered branch instructions.

FIG. 1 schematically illustrates a data processing apparatus 2 in the form of a processor core 4. The processor core 4 includes decoder circuitry 6, processing circuitry in the form of a first processing pipeline 8, a second processing pipeline 10, and a third processing pipeline 12 to perform processing operations under control of control signals generated by the decoder circuitry 6 when it decodes received program instructions I.

Power management circuitry 14 serves to provide power management for a power domain 16 which includes the third processing pipeline 12. For example, the third processing pipeline 12 may be a floating point processing pipeline which can be placed in to a low power state when it is not required for use and subject to a power management event to switch it to a high power state when it is required for use. The power management circuitry 14 is responsible for controlling such a power management event and may initiate such a power management event when, for example, a floating point program instruction is decoded by the decoder circuitry 6, or an explicit power management instruction or instructions is decoded to explicitly switch the power domain 16 from the low power state to the high power state. Other forms of power management control are also possible.

Evaluation circuitry 18 coupled to the decoder circuitry 6 and the power management circuitry 14, as well as to the processing pipelines 8, 10, 12, serves to evaluate performance characteristics associated with the execution of various paths through the program code subsequent to execution of a performance-steered branch instruction as will be described further below. These performance characteristics may include, for example, whether a particular path which is followed includes a program instruction which results in a store-exclusive failure (within a shared memory system), a cache miss within a system containing a cache memory, a power management event, such as requiring a domain to switch from a low power state to a high power state, and/or the triggering of an undefined instruction trap. Further performance characteristics may include, for example, counting the number of processing cycles taken to follow a particular path of execution subsequent to a performance-steered branch instruction and running up to when processing converges at a subsequent join instruction (see below). In other example embodiments the evaluation circuitry 18 may measure the energy consumed in following a particular path between a performance-steered branch instruction and a subsequent join instruction, e.g. by determining which processing circuitry is used in executing a path and for how long it is used. A further example performance characteristic which may be evaluated by the evaluation circuitry 18 is that a hint instruction is executed within the path concerned. A hint instruction may be keyed (referenced) back to a particular originating performance-steered branch instruction and used by the programmer to signal a particular performance characteristic which has occurred and resulted in the hint instruction being executed, e.g. the path being executed may include code which monitors how many times a particular loop of code is executed and if this exceeds a predetermined threshold, then a branch may be taken to execute a hint instruction indicating that the number of times the loop is required to execute is excessive if this particular path is followed such that when the performance-steered branch instruction is subsequently executed, a different path of execution may be selected such that the excessive number of program loop executions may be avoided.

FIG. 1 shows a shared performance characteristics memory 20 coupled to the evaluation circuitry 18. This shared performance characteristics memory 20 can store performance characteristics associated with different paths which can be executed following a performance-steered branch instruction and which have been derived from measuring/evaluating the performance of the processor core 4 when previously executing those paths. Thus, the performance characteristics which have been evaluated may be used as a form of feedback to control the selection between paths which may be followed when the performance-steered branch instruction is subsequently executed. In addition, or instead of, measuring the performance characteristics of the processor core 4, it is also possible that performance characteristics can be read from an external source, thus, previously generated data gathered from examining the execution of the program code concerned on a different system, or within a simulator, may be used to derive performance characteristics which may then be loaded into the stored characteristics memory 20 and used to guide the selection made by performance-steered branch instructions executed by the present instance of the processor core 4.

When the decoder circuitry 6 receives a performance-steered branch instruction PSB within the stream of program instructions I received at the processor core 4, it decodes this performance-steered branch instruction and identifies it as a performance-steered branch instruction. The decoder circuitry 6 then signals the evaluation circuitry 18 to supply it with performance signals it may use to determine which path of program execution should be followed subsequent to the performance-steered program instruction, e.g. should the branch be taken, or not taken. In this example two possible paths of program execution are possible subsequent to a normal branch instruction, but in some other embodiments a branch instruction may be provided which supports more than two possible paths subsequent to the branch instruction.

The decoder circuitry 6 may, for example, supply the evaluation circuitry 18 with the memory address of the performance-steered branch instruction which has been decoded. This memory address may then be used by the evaluation circuitry 18 to index into the stored performance characteristic memory to recover the stored performance characteristics associated with that memory address. It will be appreciated that this indexing could take a variety of different forms, such as the aforementioned simple index based upon memory address. More sophisticated forms of indexing could also be provided, e.g. indexing based upon a combination of the memory address and preceding history, e.g. preceding branch outcomes. The stored performance characteristics provide a prediction of the performance characteristics which will be achieved within the processor core 4 if the various different paths which are possible subsequent to the performance-steered branch instruction are followed. The evaluation circuitry 18 may use these stored performance characteristics to generate performance signals which are supplied to the decoder circuitry 6 and control that decoder circuitry 6 to select a particular path to be followed through the program flow subsequent to the performance-steered program instruction. The control signals generated by the decoder circuitry 6 and supplied to the processing pipelines 8, 10, 12 include control signals which action a branch to a particular path as selected in dependence upon performance signals received by the decoder circuitry 6.

In some example embodiments the evaluation circuitry 18 may supply the performance signals to the decoder circuitry 6 which then uses these to make a selection between the different paths which is then followed through a subsequent join instruction being executed corresponding to the convergence of the possible paths which were selected between. In this example the selected path is non-speculatively executed. The evaluation circuitry 18 may gather information concerning the performance of the processor core when it was executing that path and use that gathered information to form, or update, stored performance characteristics 20 associated with the selected path which was executed. The stored performance characteristics may then be used to control whether or not that particular path is selected if the performance-steered branch instruction is executed again.

In other example embodiments, in addition to the initial selection of the path to be followed, the evaluation circuitry 18 may be responsive to performance characterizing events detected within the processor core 4 during the execution of that path to abort execution of that path. Thus, the selection of the path to execute may be considered to be a speculative selection and the subsequent processing speculative processing which can be reversed back to the start point, i.e. back to the performance-steering branch instruction. In order to achieve such a roll back the processor core 4 may be formed to support a speculative execution whereby the results of a partially executed path are not committed until it is known that that path will be completed. If a particular path is aborted as a consequence of detected behaviour, e.g. a store-exclusive failure, a cache miss, triggering of an undefined instruction handler, an undesirable power management event, execution of a hint instruction indicating an abort should be performed, the cycle count for the path exceeding a predetermined limit, etc., then an alternative path is subsequently selected to be executed in place of the originally selected path. Thus, speculative execution of an originally selected path is subsequently followed by a next selected path should the initially selected path provide unsuitable and be aborted.

In other example embodiments, it is also possible that the evaluation circuitry 18 may control the decoder circuitry 6 to initiate parallel execution of multiple paths subsequent to a performance-steered branch instruction. The parallel execution of such multiple paths is speculative and these multiple paths may be considered to race each to reach the convergence point in the form of a join instruction. When a first path reaches the convergence point, then the other paths can be aborted/abandoned. It is also possible that such other paths may be abandoned before the first path reaches the convergence point, e.g. a particular path may invoke some undesirable action, such as a cache miss, and accordingly be aborted such that likely further undesirable actions are not actually performed.

Figure 2:
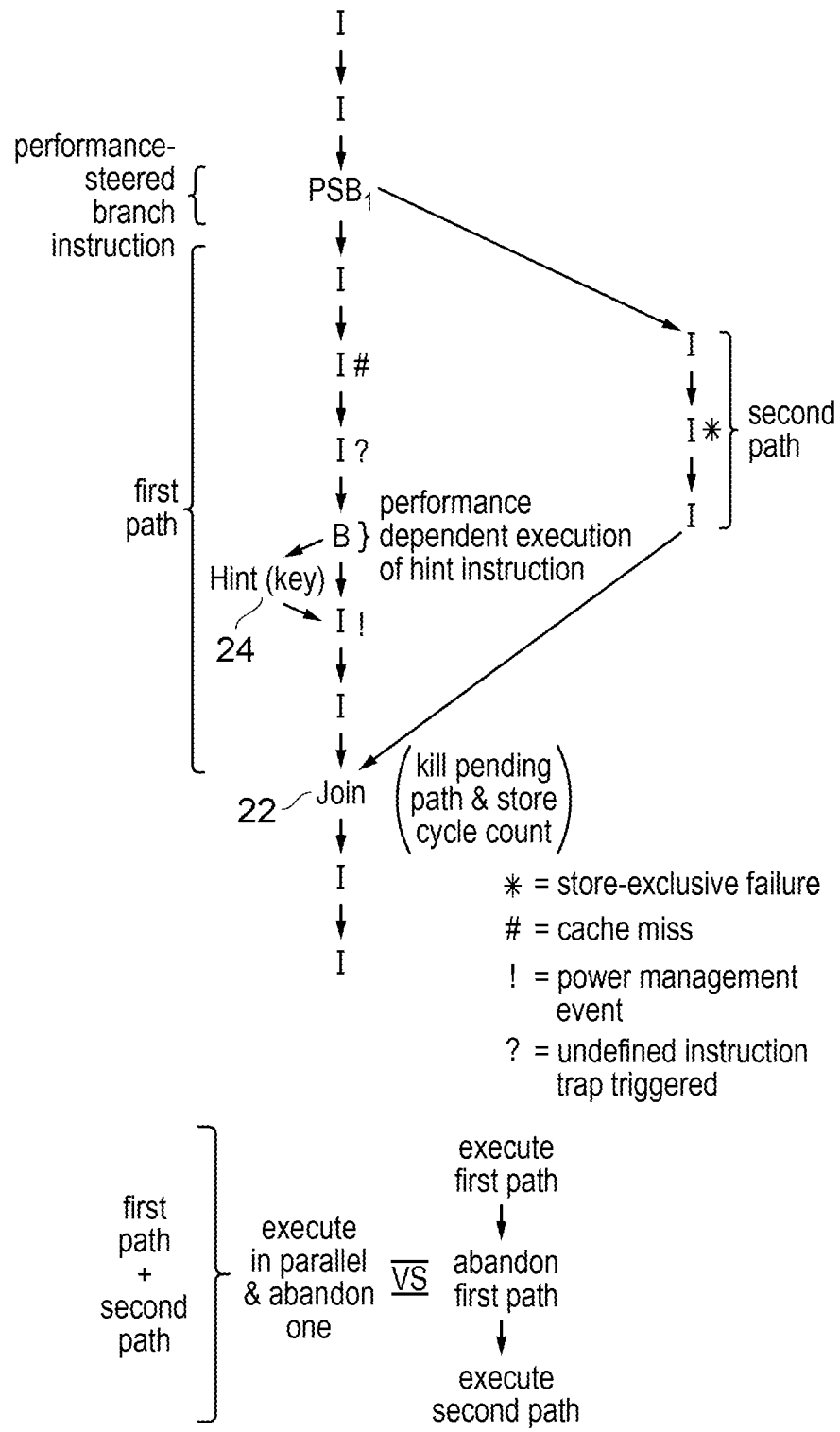
FIG. 2 schematically illustrates a sequence of program instructions which may be followed using both a first path and/or a second path through those program instructions.

FIG. 2 schematically illustrates program execution involving a performance-steered branch (PSB) instruction and multiple subsequent possible paths of execution (in this example two possible paths). As illustrated in FIG. 2, a sequence of program instructions is executed until the performance-steered branch instruction $PSB_1$ is reached. At this point a selection is made as to whether a first path or the second path is to be followed subsequent to the $PSB_1$ instruction.

In some embodiments both paths may be followed in parallel and race each other to reach the join instruction 22 which corresponds to the convergence of the first path and the second path. When such paths are followed in parallel, then execution of the join instruction will serve to kill (abort) any pending paths which are partially completed. Execution of the join instruction 22 may also trigger the evaluation 18 to evaluate the stored performance characteristics to be associated with the performance-steered branch instruction $PSB_1$ within the stored performance characteristics memory 20. These characteristics may include a cycle count of the path which has been followed between the performance-steered branch instruction $PSB_1$ and the join instruction 22. The stored performance characteristics may be indexed based upon the memory address of the performance-steered branch instruction $PSB_1$.

As illustrated in FIG. 2, the first path includes a branch instruction B which serves to branch to execution of a hint instruction 24 in dependence upon detected performance characteristics of the first path. The hint instruction 24 may be keyed (include a pointer) back to the corresponding performance-steered branch instruction $PSB_1$ as previously discussed. The execution of the hint instruction 24 may serve to generate a performance characteristic indicating that the associated path should not subsequently be selected (or in other circumstances that that particular path should be preferentially selected).

Also illustrated in FIG. 2 are various instructions within the first path and the second path which give rise to store-exclusive failures, cache misses, power management events and undefined instruction handler triggering. Such events may not occur upon each occasion a particular path is followed and may, for example, be data dependent and vary with time as the processor core 4 executes the program code concerned using different input data. Providing dynamic feedback between the performance characteristics observed for different paths which may be selected allows the performance-steered branch instruction $PSB_1$ to steer the program flow to follow a particular path having the desired performance characteristics in dependence upon effectively real time feedback of the results of following particular paths through the program code. A path not indicated by the performance characteristics as to be selected may nevertheless be periodically selected to update the performance characteristics, e.g. a circumstance which made that path unflavoured may have changed.

The different paths through the program code may all achieve the desired processing but in different ways. For example, one path through the program code may lookup a particular previously calculated value and this may be efficient if that previously calculated value is stored within cache memory. The alternative path may instead recalculate that value and this may be more efficient if it is likely that the previously calculated version of that value is not cached. The performance-steered branch instruction is able to direct the program flow to follow which of these two program paths is most likely to be most desirable in dependence upon previously observed behaviour of the code concerned, either in a different system or in the same system shortly before the performance-steered branch instruction which is now being executed, e.g. does the particular processor executing the program have a cache memory.

Figure 3:
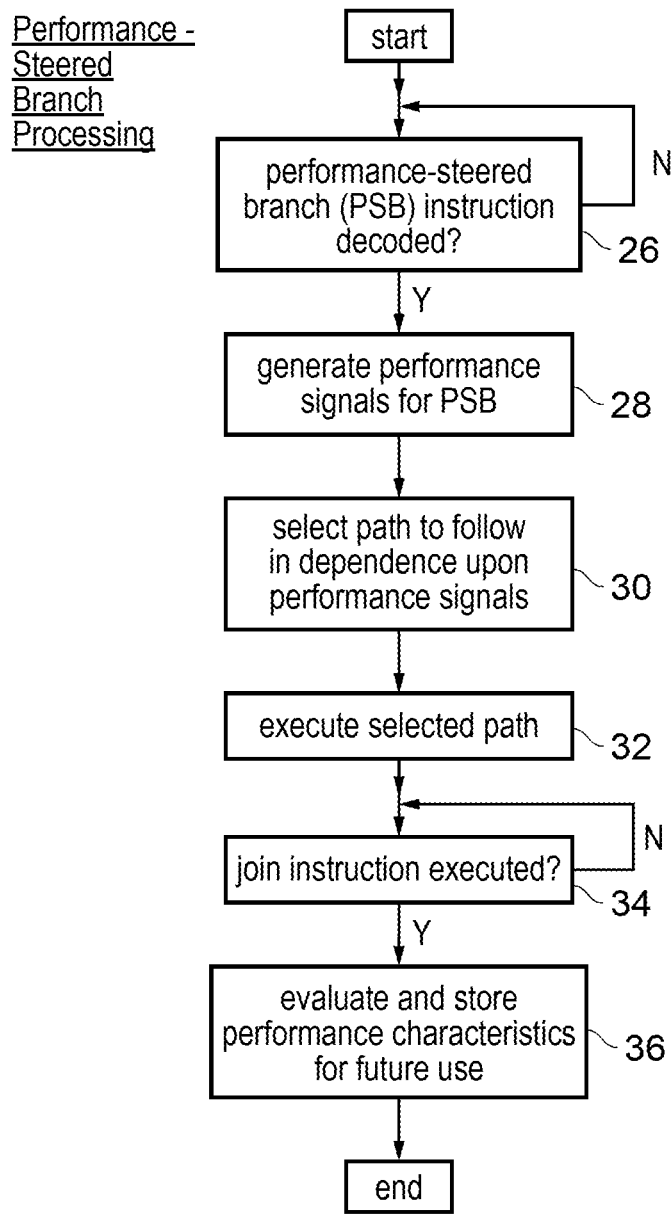
FIG. 3 is a flow diagram schematically illustrating performance-steered branch processing when a path is selected and then non-speculatively executed.

FIG. 3 is a flow diagram schematically illustrating performance-steered branch processing when speculative execution is not performed. Processing waits at step 26 until a performance-steered branch instruction is decoded. Step 28 then reads the performance characteristics from the stored performance characteristic memory 20 and generates performance signals therefrom which are supplied to the decoder circuitry 6. At step 30 the decoder circuitry 6 selects the path to be followed subsequent to the performance-steered branch instruction in dependence upon the performance signals. Step 32 executes the selected path. Step 34 waits until a join instruction is executed subsequent to the performance-steered branch instruction which was decoded at step 26. Execution of such a join instruction indicates the convergence of the paths which were selected between by the performance-steered branch instruction. When such a join instruction has been detected, step 36 serves to evaluate and store performance characteristics of the path that was selected at step 30 for subsequent use by the system in determining which paths should be followed.

Figure 4:
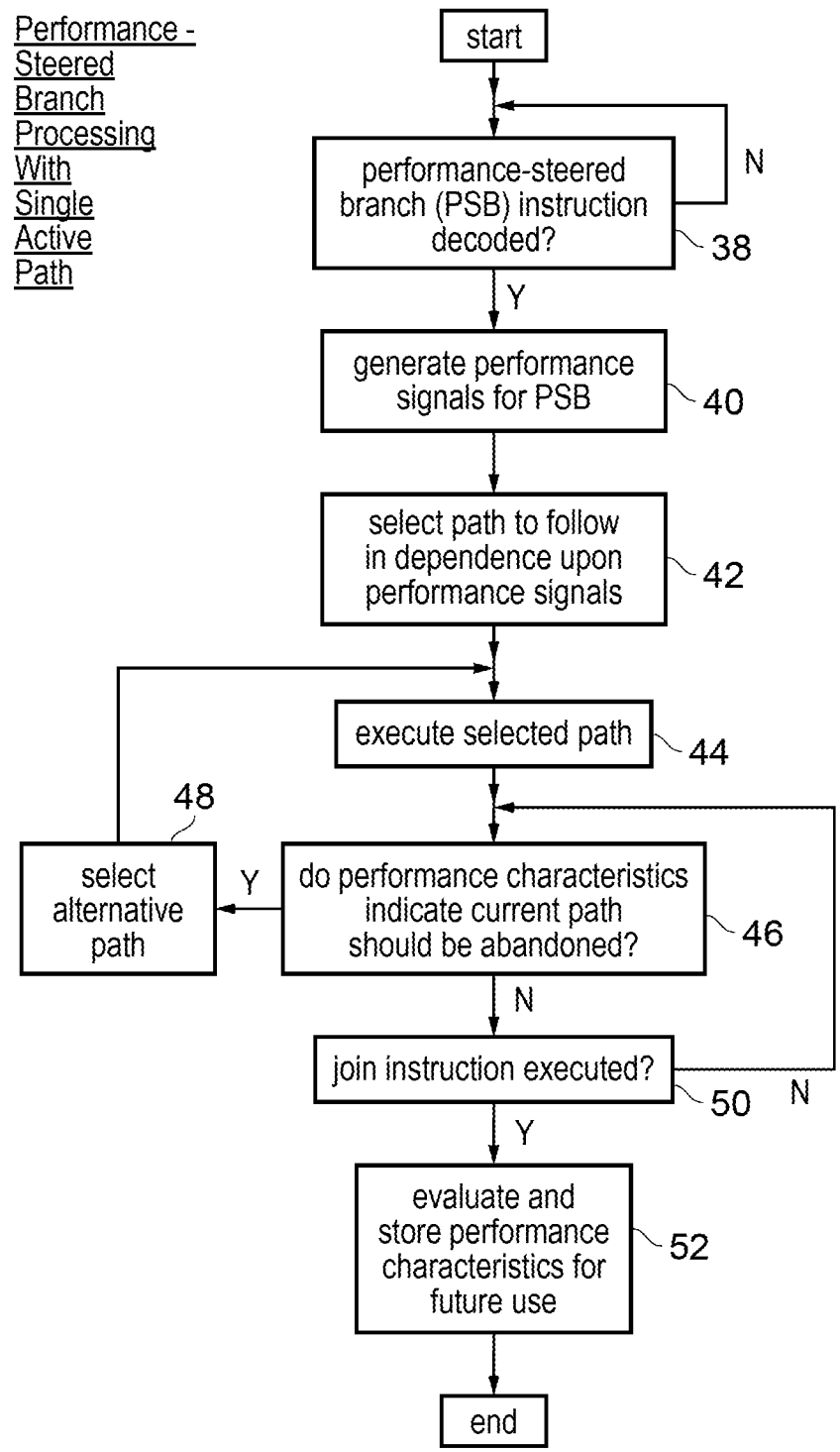
FIG. 4 is a flow diagram schematically illustrating performance-steered branch processing with a single active path which is speculatively executed.

FIG. 4 is a flow diagram schematically illustrating performance-steered branch processing employing speculative processing with a single active path. At step 38 processing waits until a performance-steered branch instruction is decoded. Step 40 generates the performance signals associated with the performance-steered branch instruction decoded at step 38 and as derived from a read of stored performance characteristics. Step 42 serves to select the initial path to follow in dependence upon the performance signals. Step 44 serves to execute the selected path. Step 46 determines whether the performance characteristics collected by the evaluation circuitry 18 from the processor core 4 whilst the selected path is being executed indicate that the currently selected cache should be aborted. If the signals do indicate that an abort is appropriate, e.g. a cache miss occurs, an undefined exception trap is triggered, etc, then step 48 serves to abort the current path and select an alternative path before processing is returned to step 40. If the performance characteristics do not indicate that the current path should be abandoned then step 50 serves to determine whether a join instruction has yet been executed. If a join instruction has not yet been executed then processing returns to step 46. When a join instruction is detected at step 50, step 52 serves to evaluate and store performance characteristics of the one or more paths which were executed (speculatively) subsequent to the performance-steered branch instruction decoded at step 38. The abandoning of partially executed speculative paths rolls back of the processing state to one matching the state when the performance-steered branch instruction was first encountered. The roll back of such speculative state may be achieved using techniques similar to those employed in out-of-order processors.

Figure 5:
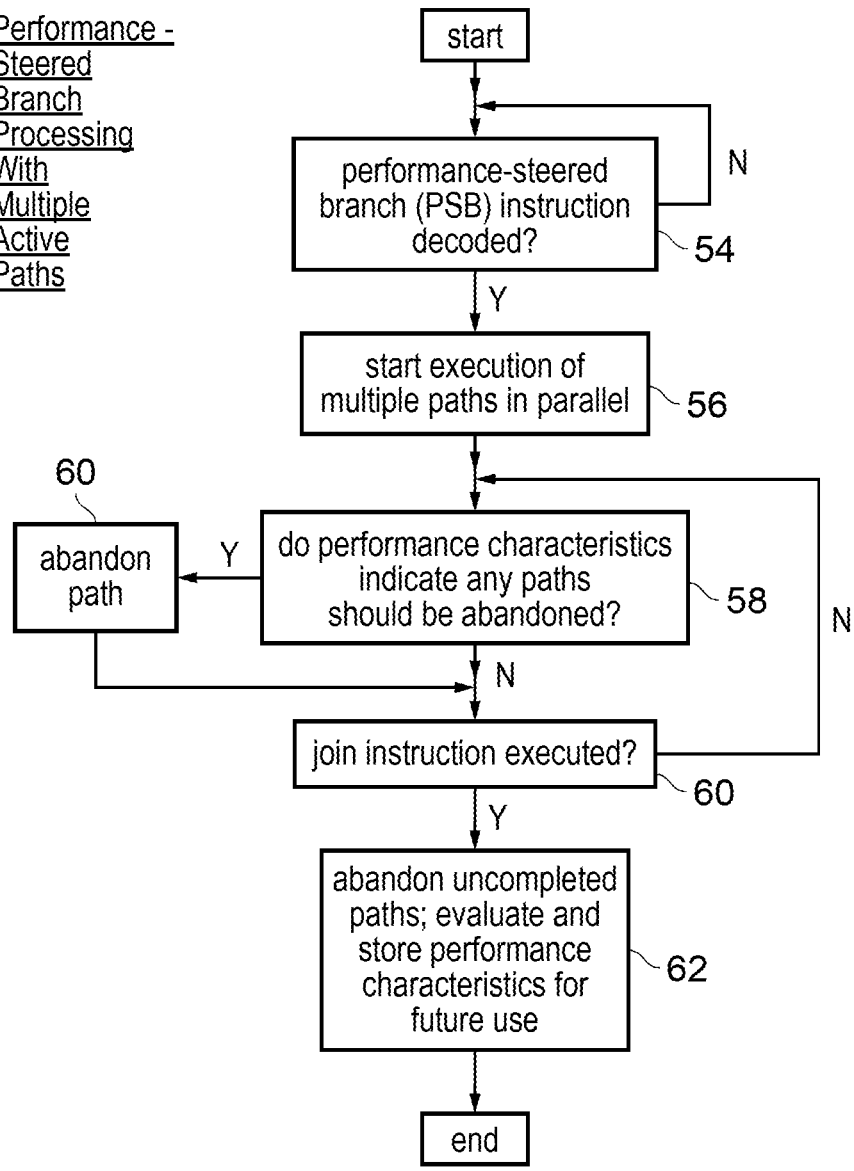
FIG. 5 is a flow diagram schematically illustrating performance-steered branch processing with multiple active paths which are speculatively processed.

FIG. 5 is a flow diagram schematically illustrating performance-steered branch processing with multiple active paths executed in parallel. At step 54 processing waits until a performance-steered branch instruction is decoded. Step 56 starts speculative execution of multiple paths in parallel. Step 58 determines whether the detected performance characteristics indicate that any of the paths currently being executed should be abandoned. If any of the currently executing paths are indicated as suitable to be abandoned, then step 60 serves to abandon these paths and restore any state which they have changed (subject to such restoration not interfering with the execution of any of the other parallel executing paths). If the determination at step 58 is that none of the currently executing paths should be abandoned, then step 60 serves to determine whether a join instruction has yet been executed. If a join instruction has not yet been executed then processing returns to step 58.

When a join instruction is executed, then step 62 serves to abandon any currently uncompleted paths as these have lost the race to reach the join instruction. The evaluation circuitry 18 also serves to evaluate and store performance characteristics for future use describing the performance of the various parallel and speculative executed paths which were followed subsequent to the performance-steered branch instruction decoded at step 54.

FIG. 6 schematically illustrates example source code which may be used to control a compiler to compile machine code which includes a performance-steered branch instruction as previously described. As illustrated in FIG. 6, this source code includes an instance_choose( ) which references stored performance characteristics which is used to perform a choice between either the first path specified or the second path specified in the source code. This choice may be dynamically achieved in the compiled code by including a performance-steered branch instruction which selects between the first path or the second path and which is steered by a parameter or parameters which may be specified within the choose instance.

Figure 7:
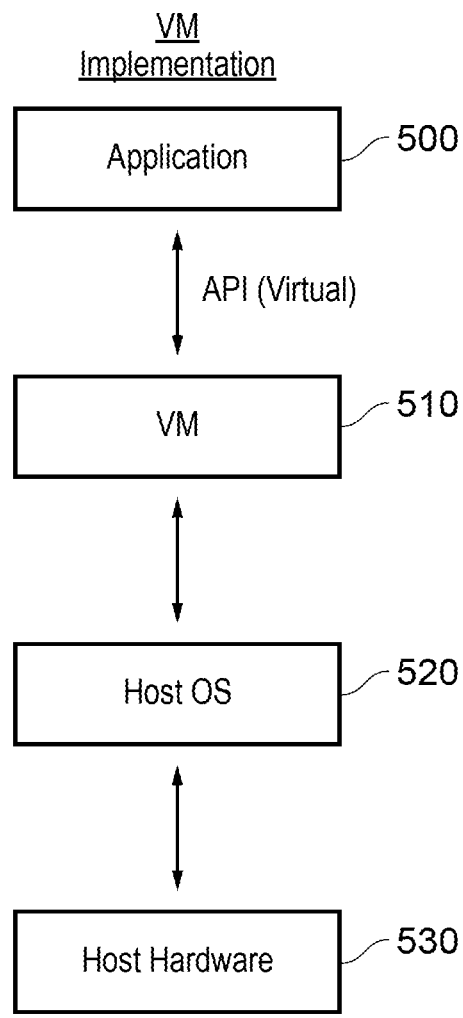
FIG. 7 schematically illustrates a virtual machine implementation of the above-described techniques.

FIG. 7 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, comprising:
   processing circuitry to perform processing operations specified by program instructions; and
   decoder circuitry to decode program instructions to generate control signals to control said processing circuitry to perform processing operations specified by said program instructions; wherein
   said decoder circuitry is responsive to a performance-steered branch instruction to generate control signals to control said processing circuitry to selectively perform a branch operation such that program flow follows one of a plurality of paths in dependence upon one or more performance signals indicative of one or more performance characteristics associated with execution of program instructions within at least one of said plurality of paths; and
   said one or more performance signals are indicative of execution of a hint instruction within one of said plurality of paths.

2. Apparatus as claimed in claim 1, wherein said hint instruction specifies a keying parameter to identify a performance-steered branch instruction associated with said hint instruction.

3. Apparatus as claimed in claim 1, wherein said one or more performance signals are indicative of failure of a store-exclusive instruction within one of said plurality of paths.

4. Apparatus as claimed in claim 1, wherein said one or more performance signals are indicative of a cache-miss arising from a memory access operation performed within one of said plurality of paths.

5. Apparatus as claimed in claim 1, wherein said one or more performance signals are indicative of greater than a predetermined number of processing cycles spent executing program instructions within one of said plurality of paths.

6. Apparatus as claimed in claim 1, wherein said one or more performance signals are indicative of a power management event occurring during execution of program instructions within one of said plurality of paths.

7. Apparatus as claimed in claim 6, wherein said power management event comprises switching a block of circuitry within said apparatus from a low power state to a high power state.

8. Apparatus as claimed in claim 1, wherein said one or more performance signals are indicative of triggering of an undefined instruction trap during execution of program instructions within one of said plurality of paths.

9. Apparatus as claimed in claim 1, wherein said processing circuitry speculatively follows in parallel two or more of said plurality of paths and abandons following all but one of said two or more of said plurality of paths in response to said one or more performance signals.

10. Apparatus as claimed in claim 1, wherein said processing circuitry speculatively follows a first of said plurality of paths and selectively abandons said first of said plurality of paths in response to said performance signals and follows a further one of said plurality of paths.

11. Apparatus as claimed in claim 1, wherein said decoder circuitry is responsive to a join instruction following a performance-steered branch instruction to indicate a convergence of program flow of said plurality of paths.

12. Apparatus as claimed in claim 1, comprising evaluation circuitry to perform an evaluation of said one or more performance characteristics of at least one of said plurality of paths.

13. Apparatus as claimed in claim 12, wherein said evaluation circuitry stores results of said evaluation to generate said one or more performance signals for controlling branch operation of a subsequently decoded performance-steered branch instruction.

14. Apparatus as claimed in claim 12, wherein said decoder circuitry is responsive to a join instruction following a performance-steered branch instruction to indicate a convergence of program flow of said plurality of paths and said evaluation circuitry is triggered to perform said evaluation by execution of said join instruction.

15. Apparatus as claimed in claim 1, wherein said one of more performance signals are generated in dependence upon performance characterising data read by said apparatus and indicative of previously determined results for said one or more performance characteristics.

16. Apparatus as claimed in claim 1, wherein said plurality of paths comprises a first path and a second path.

17. Apparatus for processing data, comprising:
processing means for performing processing operations specified by program instructions; and
decoding means for decoding program instructions to generate control signals to control said processing circuitry to perform processing operations specified by said program instructions; wherein
said decoding means is responsive to a performance-steered branch instruction to generate control signals to control said processing means to selectively perform a branch operation such that program flow follows one of a plurality of paths in dependence upon one or more performance signals indicative of one or more performance characteristics associated with execution of program instructions within at least one of said plurality of paths; and
said one or more performance signals are indicative of execution of a hint instruction within one of said plurality of paths.

18. A method of processing data, comprising:
performing using processing circuitry processing operations specified by program instructions; and
decoding program instructions to generate control signals to control said processing circuitry to perform processing operations specified by said program instructions; wherein
in response to a performance-steered branch instruction, generating control signals to control said processing circuitry to selectively perform a branch operation such that program flow follows one of a plurality of paths in dependence upon one or more performance signals indicative of one or more performance characteristics associated with execution of program instructions within at least one of said plurality of paths; and
said one or more performance signals are indicative of execution of a hint instruction within one of said plurality of paths.

19. A virtual machine providing an execution environment operating in accordance with a method as claimed in claim 18.

* * * * *